United States Patent [19]

Hendershot

[11] Patent Number: 4,951,518
[45] Date of Patent: Aug. 28, 1990

[54] ZERO BACK LASH PHASE ADJUSTING MECHANISM

[75] Inventor: Robert V. Hendershot, Evanston, Ill.

[73] Assignee: Candy Mfg. Co., Inc., Evanston, Ill.

[21] Appl. No.: 381,310

[22] Filed: Aug. 28, 1990

[51] Int. Cl.⁵ ............................ F16H 1/26; F16H 1/48
[52] U.S. Cl. ....................................... 74/395; 74/640
[58] Field of Search ................ 74/804, 805, 640, 198, 74/395

[56] References Cited

U.S. PATENT DOCUMENTS

| | | | |
|---|---|---|---|
| 3,324,746 | 6/1967 | Kari | 74/804 |
| 4,044,274 | 8/1977 | Ohm | 74/640 X |
| 4,286,476 | 9/1981 | Stiff | 74/395 X |
| 4,566,352 | 1/1986 | Stiff | 74/395 X |

Primary Examiner—Leslie A. Braun
Assistant Examiner—Khoi Q. Ta
Attorney, Agent, or Firm—McCaleb, Lucas & Brugman

[57] ABSTRACT

An electro-mechanical device for accurately retarding or advancing the timing or rotational phase relationship of machine components, such as a pair of shafts, either while the components are in motion or stationary. The device embodies a motor controlled cycloidal gear reducer operable to generate a rotational differential or relative movement between a pair of rotatable gears. Each shaft is coupled to one of the gears for movement therewith. The stator of the motor rotates with one of the gears and the rotor thereof, when energized, rotates relative to the stator and drives a generator for effecting differential rotation of the two gears and thus the two machine components.

8 Claims, 3 Drawing Sheets

U.S. Patent  Aug. 28, 1990  Sheet 1 of 3  4,951,518
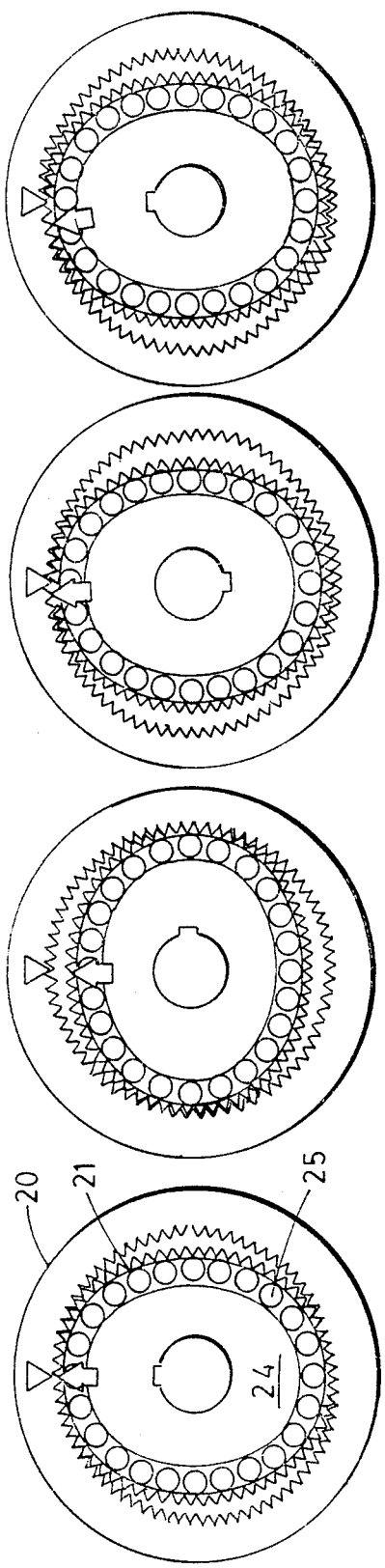
PRIOR ART
FIG. 5C
FIG. 5B
FIG. 5A
FIG. 5
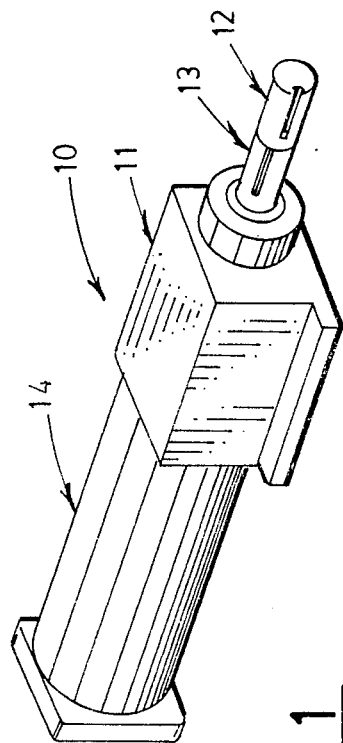
FIG. 1

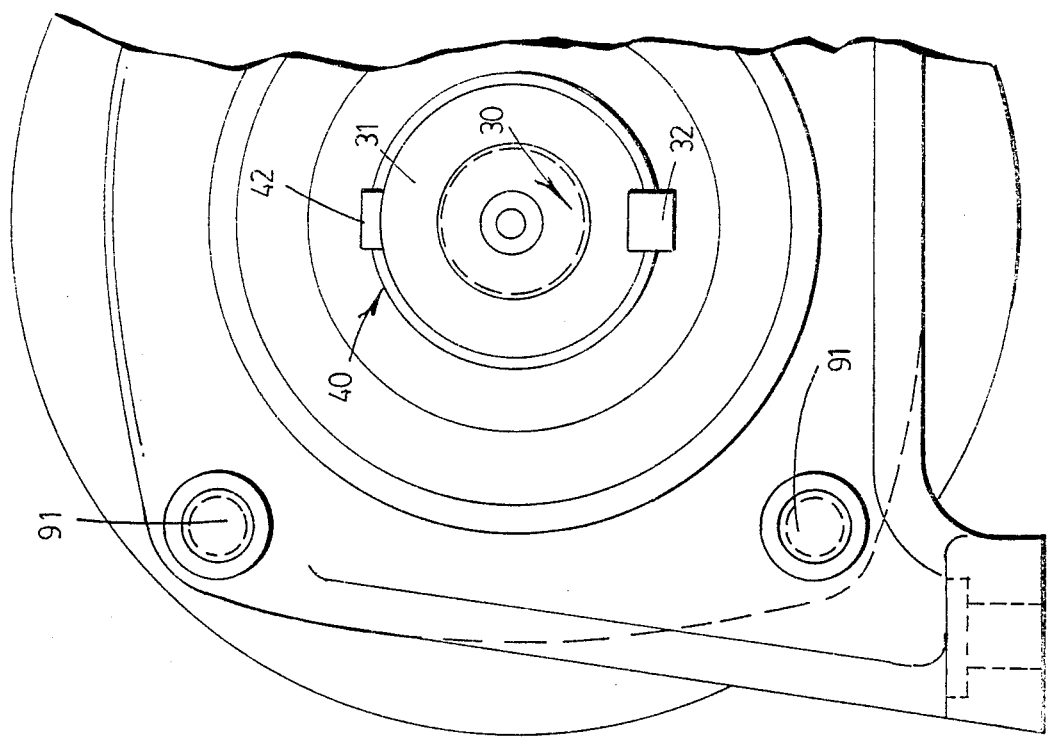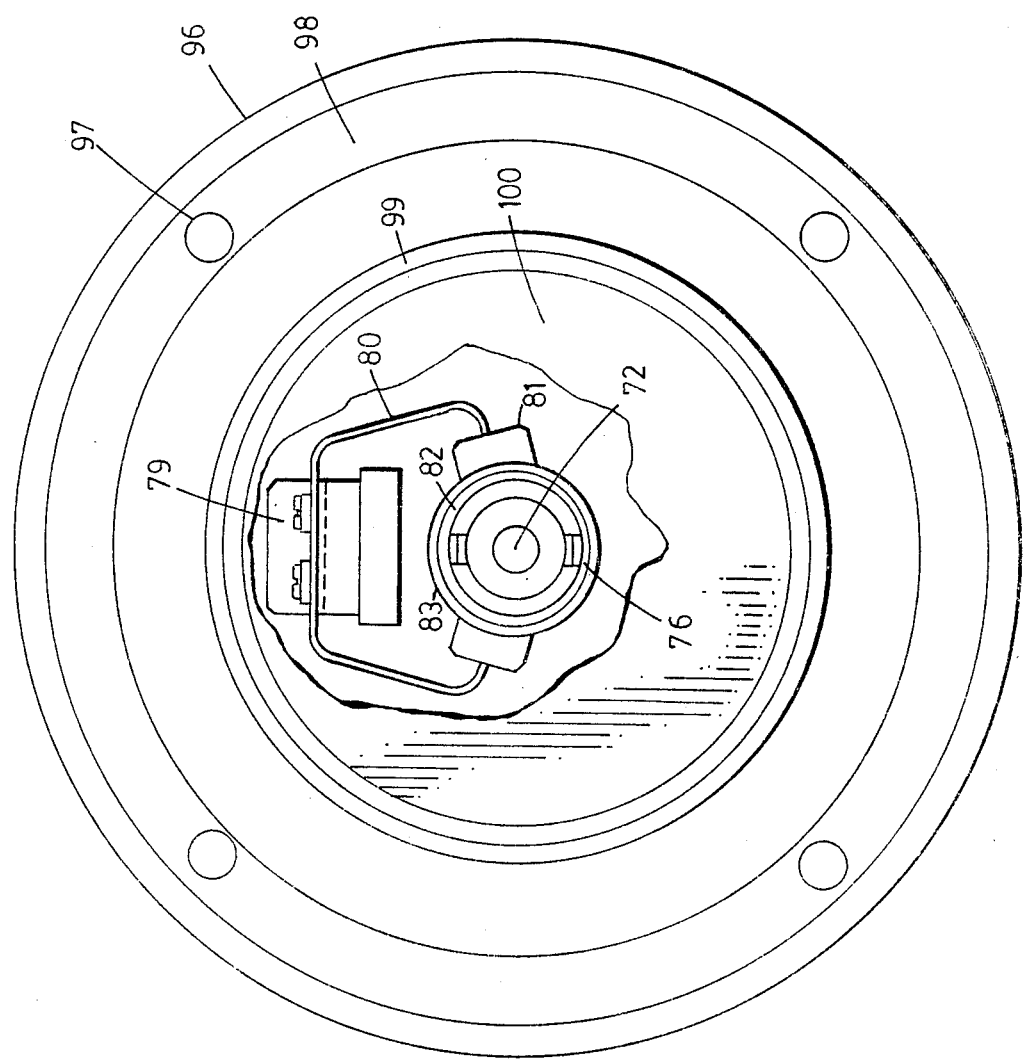

ZERO BACK LASH PHASE ADJUSTING MECHANISM

This invention relates generally to timing mechanisms useful for advancing or retarding the timing relationship of machine parts and more particularly to improvements to mechanisms for altering the phase relationship of rotatable input and output shafts Broadly this invention concerns a phase controlling transmission adapted to be interposed between driving and driven means to transmit power therebetween and operable to adjust the phase angle relationship between such which are rotatable in the means as input and output shafts same direction and at like speeds.

BACKGROUND

Numerous types of production, packaging and printing machinery require accurate synchronization of rotating elements to insure optimum machine performance. Such timing relationships are often accomplished by start and stop, trial and error adjustments. However, this is time consuming and usually produces inexact results A preferred procedure is to make such timing adjustments while the machinery is running and there are various mechanisms available to provide mechanical, while-running rotary position control. Typically, such mechanisms constitute phase controlling transmissions or gear boxes which are capable of adjusting the phase angle relationship of rotatable elements such as input and output shafts. Generally, such transmissions have taken the form of a differential gear train employing a cage moveable about the input and output shafts and coupled to the latter by intervening bevel and pinion gears. Rotatable shifting of the cage serves to rotatably shift the gears to adjust the phase or angular relationship of input and output shafts coupled thereto. Typifying transmissions of this order is that disclosed in U.S. Pat. No. 3,563,104 issued Feb. 16, 1971, to Schuster.

Such prior known devices are characterized by a serious drawbacks. Inasmuch as the differential bevel and pinion gear train employed are in constant rotation in order to transmit power between input and output shafts, speed of adjustment and operation are seriously limited accompanied by excessive heat, wear, noise, power loss and limited life span. In addition, the phase controlling transmissions typified by the aforesaid U.S. Pat. No. 3,563,104, for example, are cumbersome structures embodying heavy gear trains.

A more recent development, as set forth in U.S. Pat. No. 4,832,658 issued May 23, 1981 to the assignee hereof, overcomes many of the difficulties of the previously known phase controlling transmissions or gear boxes by eliminating the heavy pinion and bevel gears through the use of unique helical spline connections between input and output shafts that provide a smooth, quiet, cool running, positive acting and long life mechanism in which either shaft may be used as the input shaft and in which the input and output shafts rotate in the same direction at a one to one ratio and are capable of phase adjustment while running or at rest.

Both of the above referred to developments of the prior art, while successful for their intents and purposes, are nevertheless characterized by certain inherent inaccuracies in adjustment due to the presence of back lash in the gear trains involved in their structure, although the helical spline gear train of the U.S. Pat. No. 4,832,658 is less susceptible to that criticism and defect. Nevertheless it has been a long felt desire of the makers and users of such phase adjusting devices to provide a mechanical, while-running or stationary rotary position control, capable of high torque transmission with essentially zero back lash.

BRIEF SUMMARY OF THE INVENTION

This invention provides a mechanical power transmission device which is particularly useful for remote synchronization of rotary shafts or other moveable components for the purpose of adjustably advancing or retarding the timing of such shafts or components while the parent machine is running or at rest. The phase adjusting mechanism hereof is particularly characterized by having absolute minimum or essentially zero back lash while permitting the use of a wide variety of electrical motors to control either continuous or intermittent change in the relative rotational positioning, or phase, of input and output shafts or other moving components. In a preferred embodiment thereof coaxially arranged input and output shafts are controlled; such shafts rotating in one to one speed relationship and in the same direction of rotation which affords important installation and application advantages. The shafts are driven through an essentially zero back lash speed reducer employing a cycloidal gear train having a pair of concentrically related gears, with opposing intermeshable teeth and arranged so that there is a differential in the number of teeth between the two gears. The innermost gear is engaged by a rotatable wave generator capable of intermeshing the teeth of the two gears at diametrically opposed zones only whereby to effect a differential of rotation or relative rotation of the two gears. Each of the two shafts is coupled to one of the gears for movement therewith. An electrical motor for controlling operation of the wave generator is provided; the stator of the rotor being rotatable with one of the gears and the rotor thereof being coupled to the wave generator. Energization of the motor serves to rotate the rotor relative to the stator and drive the wave generator. This produces a differential of rotation between the two gears and a corresponding differential rotation of the two shafts. The range of adjustability of the phase relation of the shafts is infinite in either direction. By pulsing or jogging a pulse control motor an operator can advance or retard the angular relationship between the two shafts with extreme accuracy. A failsafe break is provided on the motor to prevent relative rotation between the stator and rotor in the event of a power failure to the motor thereby maintaining the adjusted phase relationship of the input and output shafts.

It is a principle object of this invention to provide an improved, compact, zero back lash phase adjusting device.

It is another object of this invention to provide a phase adjusting device as aforesaid which is electromechanical and capable of adjusting the rotational phase relationship of machine components, such as a pair of shafts, either while the components are in motion or at rest.

Still another important object of this invention is to provide an electro-mechanical phase adjusting device embodying a motor controlled cycloidal speed reducer operable to generate a rotational differential between a pair of rotatable gears.

Another important object of this invention is to provide an electro-mechanical phase adjusting device comprising a mechanical power transmission which is particularly useful for remote synchronization of rotating shafts.

Still another important object of this invention is to provide a mechanical power transmission device for adjusting the phase relationship and synchronization of rotating shafts which is characterized by having essentially zero back lash and which is capable of employing a variety of electrical motors to effect continuous or intermittent change in the relative rotational position or phase of input and output shafts.

Having described this invention, the above and further objects, features and advantages thereof will appear from time to time from the following detailed description of a preferred embodiment thereof, illustrated in the accompanying drawings and representing the best mode presently contemplated for enabling those of skill in the art to practice this invention.

IN THE DRAWINGS

FIG. 1 a perspective view of a motor controlled phase adjusting device according to this invention;

FIG. 3 is an enlarged end elevation with portions broken away, taken substantially from vantage line 3—3 of FIG. 2 and looking in the direction of the arrows thereon;

FIG. 4 is an enlarged partial end elevation of the right hand end of the phase adjusting device shown in FIG. 2; and FIGS. 5–5C are schematic representations illustrating the operational relationship of working elements for a cycloidal speed reducer of the prior art useful in the present invention.

DESCRIPTION OF THE PREFERRED EMBODIMENT

Figure 2:
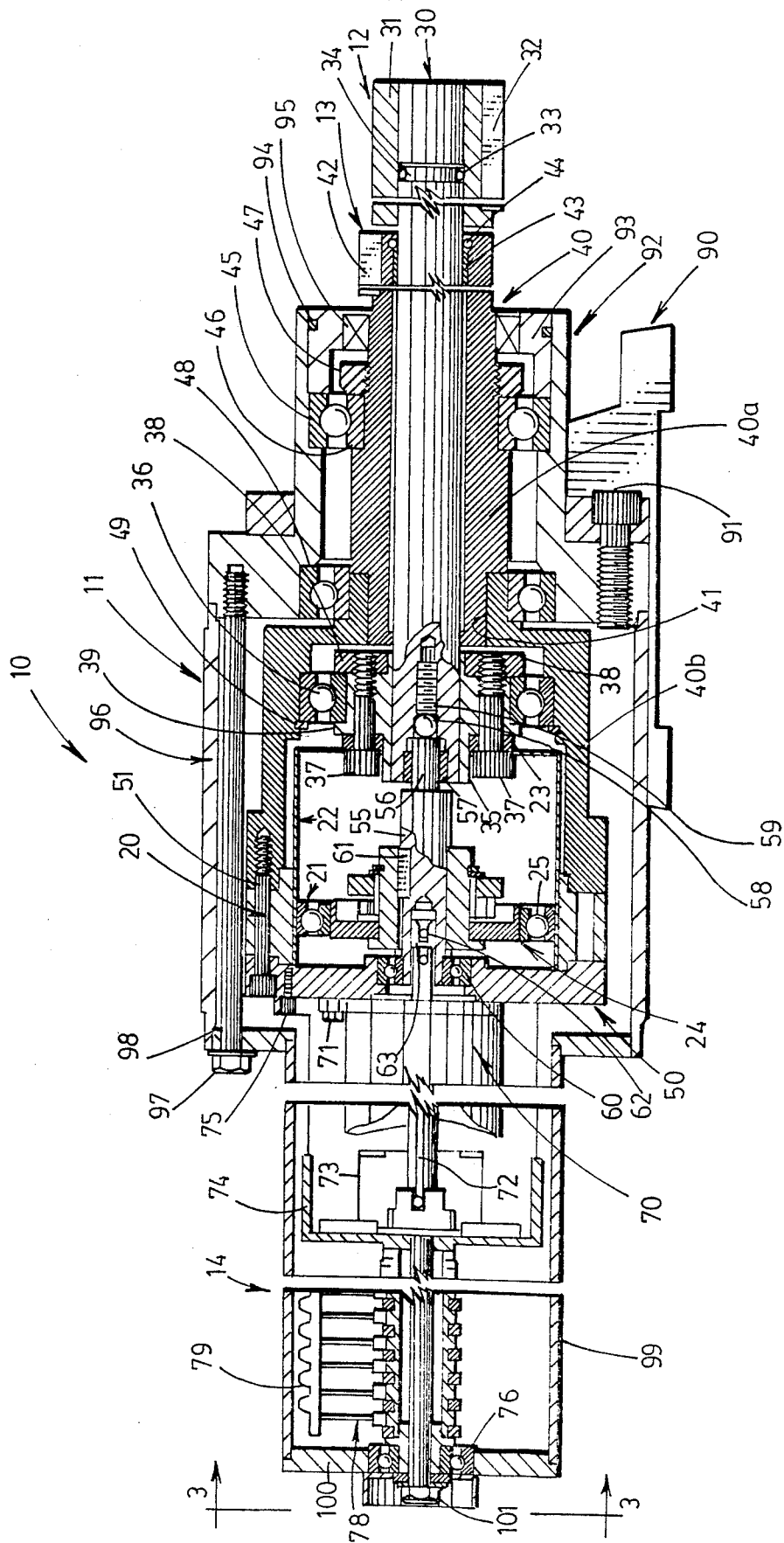
FIG. 2 is an enlarged foreshoretened, cross sectional view of the phase adjusting device illustrated in FIG. 1 and showing the arrangement of working elements and parts embodied therein.

With reference to FIG. 1 of the drawings, a perspective showing of a phase adjusting mechanism, indicated generally by 10, is therein shown as comprising a speed reducer assembly 11 and concentrically related shaft assemblies 12 and 13 connected to the speed reducer which is regulated by a control motor assembly 14. It will be noted that the two shafts 12 and 13 are concentrically related in the particular illustrated embodiment hereof and that either may constitute an input shaft or an output shaft for the speed reducer 13. The two shaft assemblies, of course, are related to a machine or mechanism driven by the output shaft and powered by the input shaft as selected. The intent and purpose of the phase adjusting mechanism 10 is to alter the rotational phase or angular relationship of the two shafts 12 and 13 so as to adjustable regulate and synchronize the mechanism, all of which will be amplified in greater detail hereinafter.

Turning now to the particulars of the preferred embodiment of this invention, references are made to FIGS. 2–4 of the drawings. As illustrated in FIG. 2 in particular, the embodiment illustrated concerns a coaxial shaft configuration with both shaft assemblies 12 and 13 extending from the same side of the mechanism. It is fully contemplated that the shafts can be arranged in line and extend from opposite sides of the mechanism, but in either case the shafts will rotate in an exact one to one relationship and in the same direction of rotation except for those instances wherein the phase or rotational angular relationship of the shafts is changed or adjusted by the speed reducer 11 upon energization of the control motor 14.

Essentially the phase adjusting mechanism according to this invention comprising a cycloidal speed reducer 11, an inner shaft assembly 12, an outer shaft assembly 13, and the motor control means 14, for adjusting the speed reducer. To better understand the workings of these major components each will be individually described foregoing order.

Speed Reducer

It will be recalled that one of the objects of this invention is to provide a phase adjusting mechanism characterized by zero back lash, while maintaining compactness of the assembly. To this end the herewith presented invention utilizes strain wave gearing in a speed reducing transmission of very simple and compact design. Such a speed reducer consists of three major elements capable of achieving essential zero back lash operation by virtue of a natural gear pre-loading and almost pure radial tooth engagement.

The first element or part of the strain wave gearing speed reducer comprises an internally toothed ring or spline gear of rigid circular configuration, indicated at 20 in FIG. 2. This ring gear is of short axial extent and is of heavy construction carrying a large number of fine internal spur gear teeth.

The second element or part of the strain wave gearing assembly comprises a flexible and thinner inner ring or spline gear 21 integral with a flexible cup 22. The flexible gear 21 carries a number of fine external spur gear teeth and is disposed concentrically within the rigid ring gear 20. The flexible cup 22, which is integral with the flexible ring gear 21, transmits torque to a heavy clamp ring 23 affixed thereto.

The third major element or component of the strain wave gearing assembly is a wave generator member 24 having an elliptical periphery bordered by an oval shaped ball bearing assembly 25 and which is disposed radially within and engages the flexible spline 21. Rotation of the generator member 24 and bearing assembly 25 causes the external teeth on the flexible gear member 21 to mesh into tight, even pre-loaded engagement with the internal spline gear teeth of the rigid circular ring gear 21 at two diametrically locations opposite the major axis of the elliptical generator 24. The wave generator so distorts the inner ring 21 that the sections adjacent the narrower part or minor axis of the oval bearing assembly clear the outer ring gear teeth. If both the inner rigid outer ring 21 and the wave generator 24 rotate exactly in time with one another there is no relative rotation of the inner ring 21 with respect to the outer ring 20 so that the two rings are maintained in exact or locked relationship. If the wave generator, however, makes one complete revolution counterclockwise, for example, relative to the outer ring then the inner ring 21 recesses counterclockwise relative to the outer ring. A flexible cycloidal speed reducer of the above described characteristics is commercially available from Quincy Technologies, Inc., Wakefield, Mass. marketed under the registered trademark "Harmonic Drive".

In the particular application illustrated herein, a cup type "Harmonic Drive" speed reducer having a 200-1 reduction ratio has been found satisfactory for the herein intended purposes. In such speed reducer the outer ring 20 typically carries 400 internal spur gear teeth while the flexible inner ring 21 generally carries 398 teeth. In other words, there is a two tooth differential between the two spline gear members.

With this arrangement one rotation of the wave generator 24 and its bearing means 25 relative to the heavy outer ring gear 20 causes the inner ring or flexible spline gear 21 to move a distance of two teeth relative to the outer ring depending on the direction of rotation of the wave generator. In this case of a 200 to 1 reduction ratio the flexible ring would move 2/400's or 1/200 of a revolution relative to the outer ring.

For a better understanding of the relationship of the cup type speed reducer described above, specific reference made to the schematic drawings FIGS. 5-5C. These figures illustrate a single revolution of the wave generator and the relative motion of the rigid and flexible spline teeth of the two gear members 20 and 21. As noted in FIG. 5, the wave generator 24 is disposed so that the teeth of the flexible spline 21 are engaged with the rigid spline gear 20 at diametrically opposing points at the initiation of the rotational sequence. FIG. 5A illustrates the movement of the wave generator clockwise 90°. Note that the zone of tooth engagement moves with the major axis of the elliptical wave generator, as illustrated. In FIG. 5B it will be noted that the wave generator has rotated 180° at which point the flexible spline gear 21 has regressed one tooth relative to the fixed spline 20. In FIG. 5C the wave generator has rotated one complete revolution relative to the fixed spline or ring gear 20. At this stage it will be noted that the flexible spline gearing has regressed two teeth relative to the rigid circular spline gear 20. With the 400 to 398 tooth relation between the fixed and flexible spline gear members, one complete revolution of the wave generator effects a 1/200 positional change of the flexible spline gear relative to the rigid spline gear, or that is 1.8° for each revolution of the wave actuator relative to the rigid spline gear 20.

With the foregoing relationship of parts in mind it will be readily understood and appreciated that by attaching one shaft to the flexible spline gear and one to the rigid spline gear the angular relationship between the input and output shafts may be altered by rotating the wave generator. In order to adapt such flexible strain wave gearing to a phase adjusting mechanism according to this invention attachment of each of the shaft assemblies 12 and 13 to one of the gear members 20 or 21 and providing means for selectively rotating the wave generator 24 in a preferred structure substantially in accordance with the illustration of FIGS. 2-4 of the drawings is provided.

Inner Shaft Assembly

As illustrated, shaft assembly 12 comprises an inner shaft in that it is disposed concentrically within the shaft assembly 13 and is coupled to the flexible inner spline gear 21 via the cup 22 and its clamp ring 23.

Specifically assembly 22 comprises an elongated cylindrical shaft 30 having a cylindrical bushing 31 mounted over the outer end thereof; such bushing carrying a key and key means 32 for connection to an appropriate sprocket or other drive connection with the machinery to be regulated. The bushing 31 preferably is mounted over an O-ground 33 held in a cylindrical kerf 34 formed axially inwardly of the outer end of shaft 30, as specifically shown in FIG. 2.

The opposite end of the elongated shaft 30 is threaded coaxially within a shouldered shaft adaptor 35 and locked in place by an appropriate adhesive. Adaptor 35 is supported by surrounding ball bearing means 36, the inner race of which is pressed onto the exterior of the adaptor 35. Six cap screws 37 extend through the clamp ring 23 of the flex cup 22 and pass through appropriate bored openings in adaptor 35 to threadingly engage an annular clamp plate 38 disposed on the opposite side of the adaptor from the clamp ring 23. Tightening of the cap screws 37 serves to rigidly join the adaptor and thus shaft 30 to the flexible cup 22 of the speed reducer assembly while at the same time axially anchoring the ball bearing assembly 36 between the clamp plate 38 and an appropriate cylindrical shoulder 39 formed on adaptor 35. It thus will be recognized that the shaft 30 is unified with the flexible cup 22 of the speed reducer assembly which carries the flexible gear member 21 so that the shaft 30 and gear member 21 rotate together in unison.

Outer Shaft Assembly

In a manner similar to the wedding of the inner shaft to the spline gear 21 of the speed reducer assembly, the outer shaft assembly 13 is coupled for rotation in unison with the rigid internally splined gear 20 of the speed reducer as well as to the stator of the motor assembly 14, as will appear presently.

To this end, the outer shaft assembly 13 comprises a relatively heavy, generally cylindrical shaft 40 having a first generally cylindrical shaft portion 40a which concentrically surrounds the inner shaft member 30 and a larger diametered cup shape portion 40b which concentrically surrounds the inner end of shaft 30 and is joined to the outer ring gear 21 of the speed reducer assembly 11. Due to the size of the two portions 40a and 40b it is preferable to manufacture the same in two pieces which are suitably shouldered and coaxially interfitted in a very close fitting. The two pieces or portions 40a and 40b are then locked together by permanent locking adhesive so to effectively unify the two parts. Such interlocking junction is indicated at 41 in FIG. 2.

The outer end of the shaft portion 40a is of substantially identical diameter with the bushing 31 associated with the outer end of the inner shaft 30 and is fitted with a key 42 for joining the same to the suitable power take off, such as a sprocket and chain drive for connection with the machine to be regulated by assembly 10. Sleeve bearing 43 and O-ring 44 are provided between the cylindrical interior of shaft portion 40a and the outer cylindrical surface of the inner shaft 30.

A first ball bearing assembly 45 is mounted about the outer end of shaft portion 40a to abut a shoulder 46 thereon. A threaded lock nut 47 is employed to hold such the bearing assembly axially in place against shoulder 46. A second ball bearing assembly 48 also supports the shaft 40 adjacent the junction of the larger diametered portion 40b and the smaller diametered portion 40a thereof; the inner races of bearing assemblies 45 and 48 being rotatable with the shaft 40. Such two bearing assemblies serve to rotatably support shaft 40.

The hollow interior of the larger diametered portion 40b of the shaft 40 is suitably shouldered adjacent one end to receive the outer race of the ball bearing assembly 36 which rotatably supports the shaft adaptor 35 mounted over the inner end of inner shaft 30. A snap ring 49 is provided to hold the bearing assembly 36 against axial displacement.

At the innermost end of the larger diametered hollow portion or section 40b of the outer shaft is a generally circular motor adaptor plate 50 which is secured by a plurality of cap screws 51 over the open end of shaft portion 40b; passing through cylindrical openings in the outer rigid ring gear 20 of the speed reducer assembly and thereby locking the latter to the shaft portion 40b. Thus the adaptor plate 50, ring gear 20 and shaft 40 rotate in unison.

It will be noted also that the wave generator 24 associated with the speed reducer is mounted within the interior of the shaft portion 40b along with the flexible cup 22. In order to support the wave guide 24, the same is provided with a centrally located cylindrical support shaft 55 having a reduced cylindrical portion 56 at one end thereof which fits into an appropriate blind bore formed in the inner end of shaft 30 to receive the shaft portion 56, a sleeve bearing 57 along with a thrust ball 58 and a set screw 59. Adjustment of the set screw, which is threadingly received in the inner end of the shaft 30, serves to regulate the thrust load on the single ball bearing 58 which bears against the end of portion 56 of the wave generator support shaft 55. The opposite end of shaft 55 is supported in a ball bearing assembly 60, the inner race of which engages shaft 55 and the outer race of which engages the motor mount adaptor plate 50. The shaft 55 is pinned to the elliptically shaped wave generator 24 as by a key and key way means 61. The wave generator shaft 55 is further provided with a cylindrical blind bore at its inner end, traversed by a coupling pin 62 for receiving a cylindrical motor shaft adaptor sleeve 63 for purposes of which will appear presently.

Motor Control Assembly

The motor assembly 14 comprises an electrical motor 70 for controlling operation of the wave generator 24 and may constitute an AC, DC, servo, synchronous or stepper motor. Motor 70 is affixed to the motor adaptor plate 50 by plurality of cap screw 71 to reside coaxially over a central opening formed through the adaptor plate 50 in which the bearing assembly 60 is mounted. A reduced outer end portion of the motor's rotor shaft 72 is coaxially received within and rotatably locked to the shaft adaptor 63 for rotation with the latter and shaft 55 of the wave generator 24. Thus energization of the motor 70 serves to rotatably drive the wave generator as selected.

The stator of the motor 70 on the other hand is fixed to the adaptor plate 50 as previously noted for rotation therewith and thus with the outer shaft assembly 13 as previously described. The motor utilized must importantly equipped with a fail-safe brake to prevent reverse torque phase shifting of the shafts 30 and 40 when motor power is off. The brake, indicated generally at 73, is mounted on the rotor shaft 72 at the rearward end of motor shell 74 to which the brake is attached. The shell 74 is affixed to the motor adaptor plate by additional cap screws 75 so that such shell, the stator and brake rotate with the outer shaft assembly 13.

Disposed rearwardly of the brake 73 and surrounding an extension of the motor shaft 72 which is supported by bearing assembly 76, is a slip ring assembly 78 comprising a terminal block 79, springs 80, contactors 81 and a series of slip rings 82 and insulators 83 according to conventional practice (see FIG. 3). The slip ring assembly of course serves to commute electrical energy to the motor 70 for energizing the same via appropriate electrical wiring (not shown).

With the above described arrangement, when a stepper motor, for example, with a fail-safe brake is employed, the brake is released and energizing current prevents relative rotation between the motor stator and rotor. The interconnected drive elements of the strain wave gearing transmission, that is the spline gear 20 and the wave generator 24 rotate in unison with the motor and this in turn causes the inner flexible spline gear 21 to rotate therewith in locked relationship with the rigid spline gear 20. It follows therefore that the inner and outer or input and or output shafts of the phase adjusting mechanism of this invention also rotate in locked relationship in a one to one relation and in the same direction. In the event of a complete power failure the fail-safe brake assembly activates to prevent relative rotation of the motor stator and rotor. Hence, the brake serves to maintain the locked relationship of the input and output shafts. If no such brake were present, the reverse torque transmitted through the speed reducing transmission, particularly at a 200 to 1 ratio as above described, would effect rapid disarray of the phase relationship of the input and output shafts, and in addition might very well destroy the mechanism. When pulse current is provided to a stepper motor, for example, the rotor will rotationally advance or retard relative to the stator to drive the wave generator 24. This in turn, through the strain wave gearing transmission and the connected shafts, causes relative rotation of the shaft assemblies 12 and 13 to change their relative rotational position or phase.

Support Housing

Having described the various working elements of the improved phase adjusting mechanism of this invention, it will seem that the same are enclosed and supported within a support housing comprising a heavy cast metal pedestal or foot mount 90 which is attached by a plurality of cap screws 91 to an enlarged base flange portion of a bearing mount member 92 which supports the outer races of the ball bearing assemblies 45 and 48 that rotatably support and carry the outer shaft assembly 13. The right hand end of the bearing mount 92 as viewed in FIG. 2 of the drawings carries an annular oil seal adaptor 93 equipped with an O-ring 94 having sealed engagement with the internal cylindrical surface of the bearing housing and an oil seal 95 engageable with the exterior of the outer shaft 40a.

A cylindrical housing tube 96 concentrically surrounds and covers portion 40b of the outer shaft as well as the strain wave gearing assembly, such being held in place by a plurality of cap screws or elongated bolts 97 which extend through the motor adaptor plate 50 and an annular flange 98 at one end of a tubular motor cover 99 which surrounds the motor 70, its casing 74 and the slip ring assembly 78. The outer end cap 100 of the tubular cover 99 supports the bearing assembly 76 that rotatably supports the outer end of the motor shaft 72. The latter is axially locked in position by locking nut 101.

From the foregoing it is believed that those familiar with the art will readily understand and appreciate the novel advancement presented by the present invention and will recognize that while the same has herein been described in association with a preferred embodiment thereof illustrated in the accompanying drawings, the same is nevertheless susceptible to variation, modification and substitution of equivalents without departing from the spirit and scope of this invention which is intended to be unlimited by the foregoing except as may appear in the following appended claims.

The embodiments of the invention in which I claimed an exclusive property or privilege are defined as follows:

1. An electro-mechanical phase adjusting mechanism for synchronizing rotatable machinery components while moving or at rest, comprising:
   a pair of coaxially aligned rotatably mounted shafts, one of which is driven by the machinery;
   a cycloidal speed reducer comprising first rotatable gear means coupled to one of said shafts, second rotatable gear means coupled to the other of said shafts, rotatable means for intermeshing said gear means and selectively operable to effect a rotational differential between said gear means; and
   an electrically energized motor means having its stator coupled to one of said gear means for rotation therewith and its rotor coupled to said rotatable means for selectively operating the latter.

2. The phase adjusting mechanism of claim 1, and means for interlocking the rotor and stator of said motor means to prevent relative rotation thereof.

3. The phase adjusting mechanism of claim 1, wherein said speed reducer embodies harmonic strain wave gearing in which said first gear means in a rigid annular spline gear having teeth along its interior circumference, said second gear means is a flexible spline gear having external teeth engageable with the teeth of said first gear means, and said means for intermeshing said gear means comprises an elliptical wave generator adapted to constantly intermesh the teeth of the two spline gears at opposite ends of the major axis thereof and to disengage said teeth at opposite ends of its minor axis; said flexible spline gear having fewer teeth than said rigid spline gear whereby rotation of said wave generator relative to said rigid spline gear effects said rotational differential.

4. The combination of claim 1, wherein said first gear means is a rigid annular internally toothed spline; said second gear means is a flexible externally toothed annular spline, and said means for intermeshing said gear means is an elliptical member rotatable with and relative to said flexible spline and which operatively deflects said flexible spline to continuously engage the teeth thereof with the teeth of said rigid spline only opposite the major axis of said elliptical member.

5. The combination of claim 1, wherein said pair of shafts are concentrically mounted, said coaxially aligned with said shafts, and said speed reducer is located coaxially between said motor means and said shafts.

6. The phase adjusting mechanism of claim 1, and fail-safe brake means coupled to the rotor of said motor means and operable, in the event of power failure to the latter, to prevent relative rotation of the stator and rotor of said motor means whereby to prevent relative rotation of said shafts.

7. The phase adjusting mechanism of claim 1, wherein said rotatable means constitutes an elliptical member operable to intermesh the teeth of said gear means with radially pre-load force whereby to affect zero back lash operation of said gear means.

8. The phase adjusting mechanism of claim 1, wherein said motor means rotates with said speed reducer and said shafts and is electrically powered via a slip ring assembly.

* * * * *

UNITED STATES PATENT AND TRADEMARK OFFICE
CERTIFICATE OF CORRECTION

PATENT NO. : 4,951,518
DATED : August 28, 1990
INVENTOR(S) : Robert V. Hendershot It is certified that error appears in the above-identified patent and that said Letters Patent is hereby corrected as shown below:

On the title page item [22] Filed: "August 28, 1990" should be --July 18, 1989--.
Col. 1, lines 14 and 15, after "such" insert -- means as input shafts which are rotatable in the same direction and at like speeds. --;
Col. 1, line 24, after "results" insert -- . --;
Col. 5, line 68, "O-ground" should read -- O-ring --;
Col. 9, line 6, delete "claimed" and insert -- claim --;
Col. 10, line 16, after "said" insert -- motor means is --.

Signed and Sealed this

Eighteenth Day of February, 1992

Attest:

HARRY F. MANBECK, JR.

*Attesting Officer*   *Commissioner of Patents and Trademarks*